US008913257B2

(12) United States Patent
Ito (10) Patent No.: US 8,913,257 B2
(45) Date of Patent: Dec. 16, 2014

(54) IMAGE FORMING APPARATUS, METHOD AND PROGRAM OF MANAGING THE IMAGE FORMING APPARATUS BY RESERVING AREA FOR IDENTIFIED COUNTER

(75) Inventor: Daisuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/295,814

(22) Filed: Nov. 14, 2011

(65) Prior Publication Data

US 2012/0127500 A1 May 24, 2012

(30) Foreign Application Priority Data

Nov. 18, 2010 (JP) .................................. 2010-258263

(51) Int. Cl.
*G06F 3/12* (2006.01)
*G06F 21/12* (2013.01)

(52) U.S. Cl.
CPC ...... *G06F 21/121* (2013.01); *G06F 2221/2135* (2013.01)
USPC ........................... 358/1.13; 358/1.12; 358/1.1

(58) Field of Classification Search
CPC ......... G06F 15/00; H04M 15/00; H04W 4/24
USPC ......................................... 358/1.13, 1.12, 1.1
See application file for complete search history.

(56) References Cited

U.S. PATENT DOCUMENTS

2003/0137682 A1\* 7/2003 Sakai et al. .................. 358/1.13
2009/0066999 A1\* 3/2009 Ito ............................... 358/1.15

FOREIGN PATENT DOCUMENTS

JP 2004-129047 A 4/2004

\* cited by examiner

*Primary Examiner* — Benny Q. Tieu
*Assistant Examiner* — Martin Mushambo
(74) *Attorney, Agent, or Firm* — Canon U.S.A., Inc. IP Division

(57) ABSTRACT

When an application is installed in an image forming apparatus, a counter used for the application is identified by using identification information indicating counters used in relation to a function of the application from among a plurality of counter types specified according to a type of the image forming apparatus, and an area for the identified counter is reserved in a storage area in the image forming apparatus.

6 Claims, 10 Drawing Sheets

| ITEMS | COUNTED VALUES |
|---|---|
| COLOR SCAN | 10 |
| COLOR PRINT | 15 |
| MONOCHROME SCAN | 5 |
| MONOCHROME PRINT | 10 |
| FREE REGISTER 1 | 100 |
| FREE REGISTER 2 | 150 |

| ITEMS | COUNTED VALUES | |
|---|---|---|
| COLOR SCAN | 10 | ~403 |
| COLOR PRINT | 15 | |
| FREE REGISTER 1 | 100 | |
| FREE REGISTER 2 | 150 | |

IMAGE FORMING APPARATUS, METHOD AND PROGRAM OF MANAGING THE IMAGE FORMING APPARATUS BY RESERVING AREA FOR IDENTIFIED COUNTER

BACKGROUND OF THE INVENTION

1. Field of the Invention

The present invention relates to a technology for managing counter information in an image forming apparatus.

2. Description of the Related Art

Conventionally, hardware counters with a mechanical counting system have been commonly used as devices used to count service charges and various kinds of information in image forming apparatuses. The image forming apparatuses include single-function peripherals (SFP) with a function such as a printer, and multi-function peripherals (MFP) with plural functions such as a scanner and a printer. Decreasing the counted value in the hardware counter cannot easily be decreased. For this reason, hardware counters are suitable for counting service charges from a security point of view, (e.g., preventing data tampering).

Progress has been made in the use of software counters in an effort to provide more counters to improve the functionality of image forming apparatuses and to reduce cost and space savings. As in the case of hardware counters, software counters also record counted values in a storage device. The following description will refer to software counter(s) simply as counter(s). Counters are used to measure and store various kinds of usage, such as a number of execution times of an application (program) within an image forming apparatus, a number of times of operation of the image forming apparatus, and an operating time of the application. For example, a technique has been disclosed which optimally controls the number of execution times of an application by setting an upper limit to a counter used for the application, and varying the upper limit according to changes in the structure of the application (in Japanese Patent Application Laid-Open No. 2004-129047, for example).

In a small-sized, low-cost type image forming apparatus which requires cost-cutting efforts, some image forming apparatuses adopt only a very small storage for the counters in order to reduce hardware cost. More specifically, there are two groups of image forming apparatuses: those with sufficient amounts of storage and those with very small amounts of storage. Under the conventional technology, when an application of the same type is used in the image forming apparatuses of the two groups, the counters of the same type consume memories in both apparatuses. Therefore, it is difficult to appropriately manage the memories, which are consumed by the counters of the image processing apparatuses.

SUMMARY OF THE INVENTION

The present invention is directed to an appropriate management of the storage areas consumed by the counters.

According to the present invention, an image forming apparatus includes an identification unit configured to, when at least one application is installed in the image forming apparatus, identify a counter used for the at least one application based on identification information indicating counters used in relation to a function of the at least one application from among a plurality of counter types specified according to a type of the image forming apparatus. The image forming apparatus further includes a counter generating unit configured to reserve an area for the counter identified by the identification unit in a storage area provided in the image forming apparatus. The counter generating unit further reserves in the storage area, an area for counters, a required number of which is set for each application.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DESCRIPTION OF THE EMBODIMENTS

The accompanying drawings, which are incorporated in and constitute a part of the specification, illustrate exemplary embodiments, features, and aspects of the invention and, together with the description, serve to explain the principles of the invention. The exemplary embodiments described herein are not intended to define the limits of the invention. All configurations described in the exemplary embodiments are not necessarily indispensable to perform the tasks of the invention.

Figure 1:
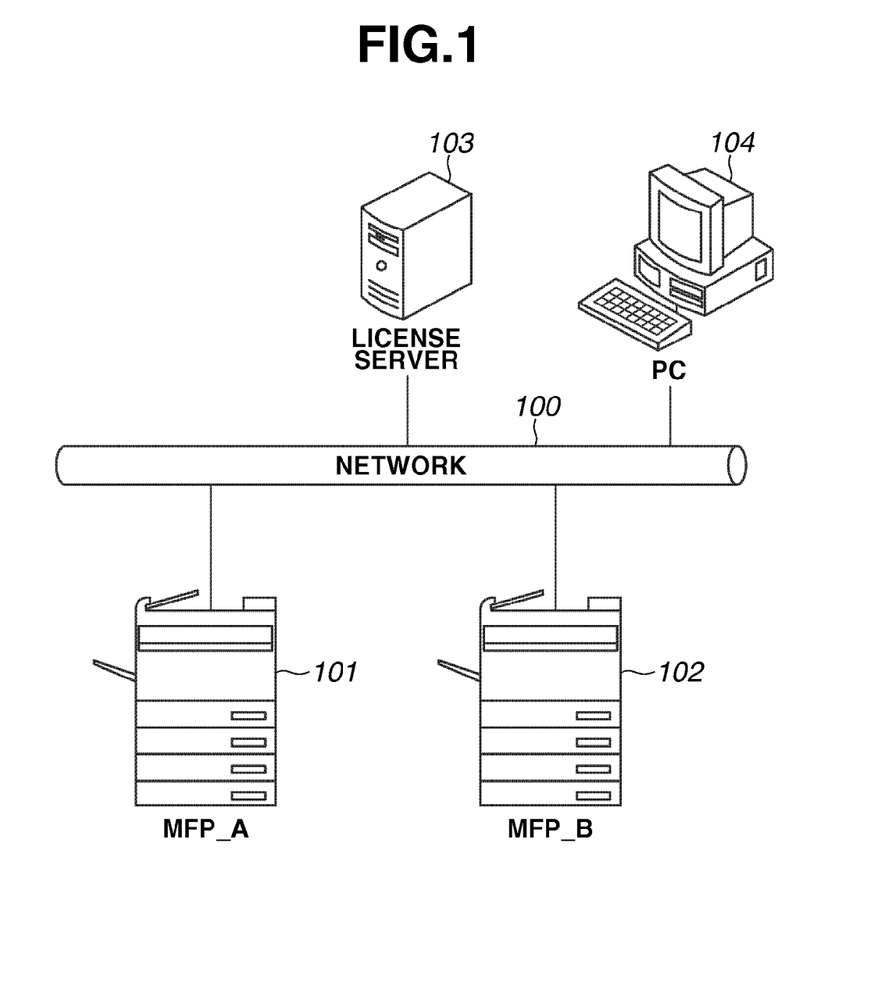
FIG. 1 is a diagram illustrating an example of a configuration of a storage area management system according to the present invention.

FIG. 1 is a diagram illustrating an example of a configuration of a system (i.e., a storage area management system) according to an exemplary embodiment of the invention. This storage area management system includes an MFP_A101, an MFP_B102, a license server 103, and a PC104. The MFP_A101, the MFP_B102, the license server 103, and the PC104 are connected via a network 100 to communicate with each other. The number of devices connected to the network is not limited to those described in the above example.

The MFP_A101 and the MFP_B102 are examples of the image forming apparatus (a computer) having plural functions, such as a scanner, a printer, a copier, and a facsimile. The MFP_A101 and the MFP_B102 communicate with the license server 103 via the network 100. The MFP_A101 and the MFP_B102 are not limited to multi-function machines. For example, the MFP_A101 and the MFP_B102 may be single-function machines, such as a facsimile, a printer, or a scanner. The MFP_A101 and the MFP-B102 may be, for example, controllers which are built into them.

The hardware configuration of the MFP_A101 and the MFP_B102 (hereinafter referred to as the MFP) will be described. The MFP includes a CPU, a display panel, an operation unit, a scanner unit, a printer engine unit, a ROM, a RAM, a non-volatile memory, and a network interface unit (not shown).

The CPU controls the MFP. The display panel displays information, such as various settings. The operation unit issues an operation command to the scanner unit or the printer engine unit, or issues a command to execute various types of programs. The scanner unit reads a document and converts read document into image data. The printer engine unit prints the image data on a printing sheet.

The ROM stores programs (program code) to control the CPU, the scanner unit, and the printer engine unit, and also stores programs to perform display operations on the display panel and the operation unit. The RAM is a type of storage area and functions as a work memory of the CPU. For example, the RAM temporarily stores image data of a document read by the scanner unit, and image data to be used when printing is performed by the printer engine unit. Examples of a non-volatile memory include a flash memory and a hard disk (HDD). and are used to store various types of information, such as tables.

The network interface unit connects the MFP to the network 100. For example, the network interface unit receives a license from an external device, e.g., PC 104, connected to the network 100, and transmits (outputs) the license, which has been processed, to an external device, e.g. license server 103.

In the present exemplary embodiment, the functions and a plurality of processing of the MFP can be implemented when the CPU executes operations according to a procedure of a program stored in the ROM.

The license server 103 and the PC 104 are examples of an information processing apparatus (a computer). The functions of the license server 103 and the PC will be described below.

The hardware configuration of the license server 103 and the PC (an information processing apparatus) will now be described. The information processing apparatus includes an input interface, an output interface, a CPU, a ROM, a RAM, a non-volatile memory, and a network interface (not shown). The input interface, which is connected to input devices, such as a keyboard and a mouse, receives an input of an operation from the input device performed by a user (a user's operation). The output interface is connected to output devices, such as a monitor or a display unit.

The ROM stores various programs, and the non-volatile memory stores an operating system (OS) and various types of data. The RAM is used as the work memory of the CPU, e.g., the work memory for various applications stored in the non-volatile memory). In the present exemplary embodiment, the functions and a plurality of processing of the information processing apparatus can be implemented when the CPU performs operations according to a procedure of a program stored, for example, in the ROM.

Figure 2:
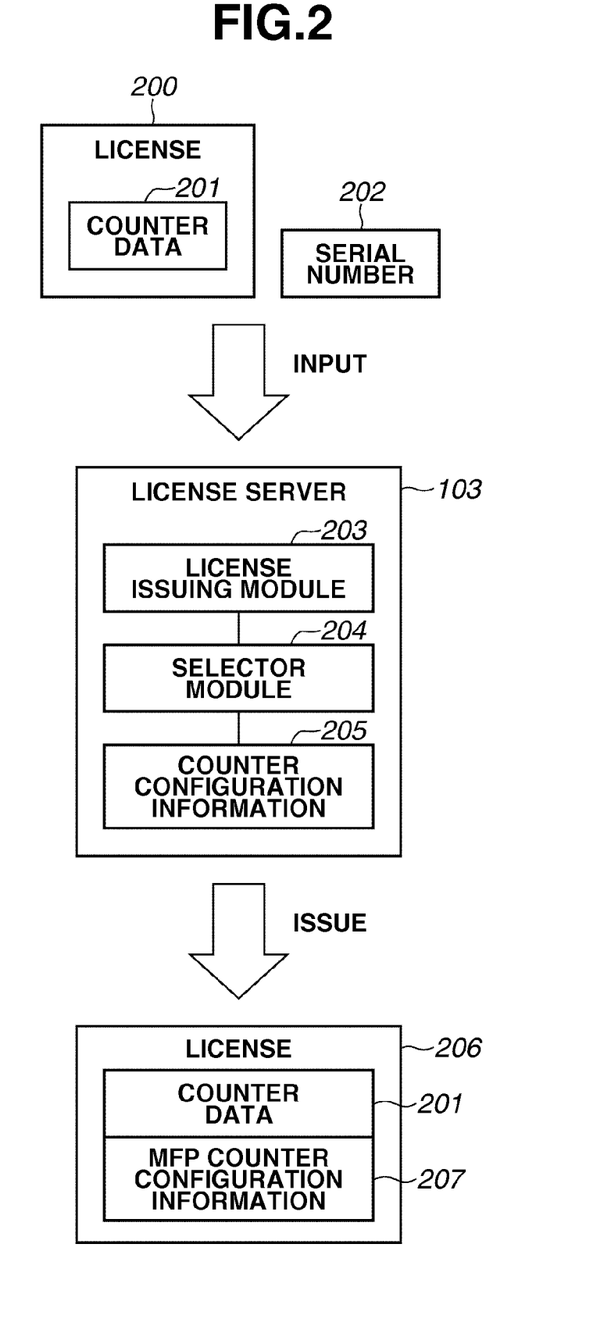
FIG. 2 is an example illustrating a function configuration of a license server.

FIG. 2 is a diagram illustrating an example of a function configuration of the license server 103. The license server 103 has a function to issue a license 206, which is described below in more detail, which is used when an application is installed in the MFP.

The license server 103 includes a license issuing module 203 and a selector module 204 configured to select counter configuration information 205 to be prescribed according to a type of the MFP in response to a request from the license issuing module 203.

The license server 103 uses a serial number 202 and a license 200 as inputs for a processing to issue a license. Because a serial number 202 has been defined in the MFP where an application is installed, the serial number 202 is obtained from the MFP through the PC 104. The license 200 is obtained through the license server 103 from an MFP different than the MFP where the application is installed. The license 200 includes plural types of counter data 201 that can be used by the application to be installed in the MFP. The counter data 201 will be described in greater detail by referring to FIG. 3.

The license server 103 issues a license 206 which is used when an application is installed based on a serial number 202 and a license 200. A license 206 includes counter data 201 and counter configuration information (a type of prescribing information) selected by the selector module 204. In the present embodiment, MFP counter configuration information 207 is used as counter configuration information. The MFP counter configuration information 207 will be described below with reference to FIG. 4.

Figure 3:
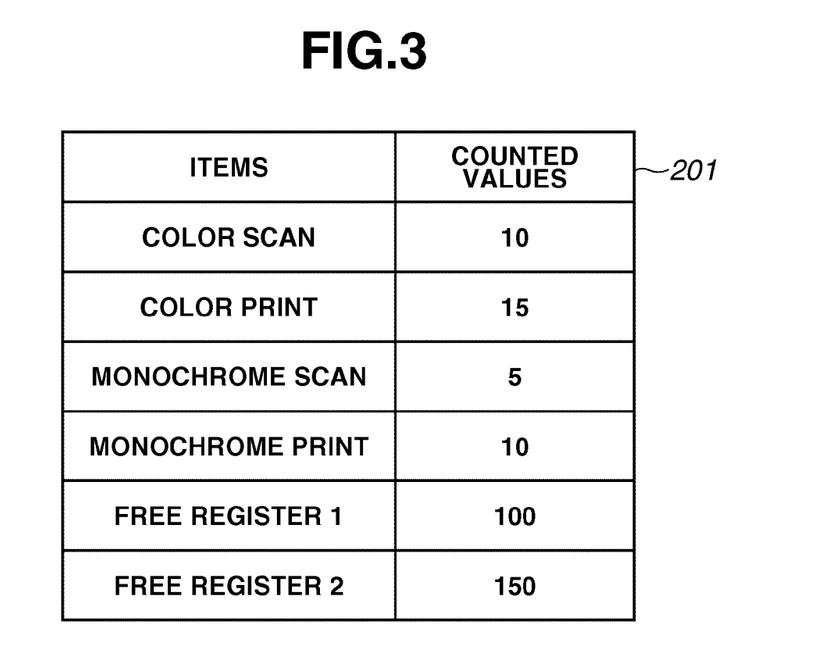
FIG. 3 is a diagram illustrating an example of counter data.

FIG. 3 is a diagram illustrating an example of counter data 201. The counter data 201 includes information, such as items for identifying counters and the values of the counters. For example, a counter value "10" of a counter "Color Scan" means that color scan was performed 10 times.

Free registers refer to the counters prescribed according to an application or a type of application. For example, free registers are assigned jobs to count numbers, such as to count a number of times of operation of the MFP, or a length of time of use of application, for each sector. The free registers are counters, the use of which can freely be set, and settings may be made through the use of the PC 104. The number of free registers is increased or decreased according to the type of application and based on an administrator's intention (settings). The number of registers required for each application is written, for example, in a manifest file of the application.

Figure 4:
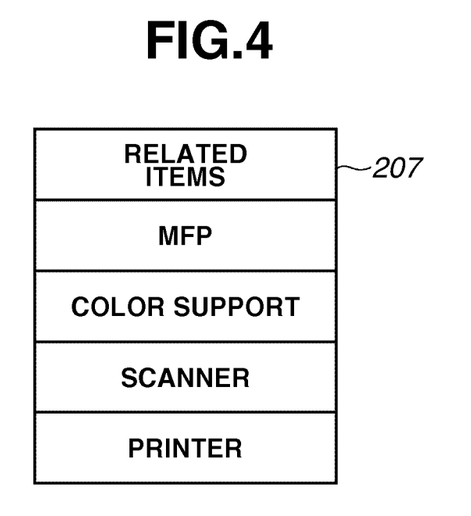
FIG. 4 is a diagram illustrating an example of counter configuration information.

FIG. 4 is a diagram illustrating an example of MFP counter configuration information 207. The MFP counter configuration information 207 includes information, such as items for identifying the MFP, and items for identifying whether the MFP supports color image or monochrome image forming, and items for identifying functions of the MFP.

FIG. 4 indicates that the apparatus in which an application is installed, i.e., the apparatus at the destination of a license 206, is an MFP, color image is supported, and the scanner and printer functions are provided.

Figure 5:
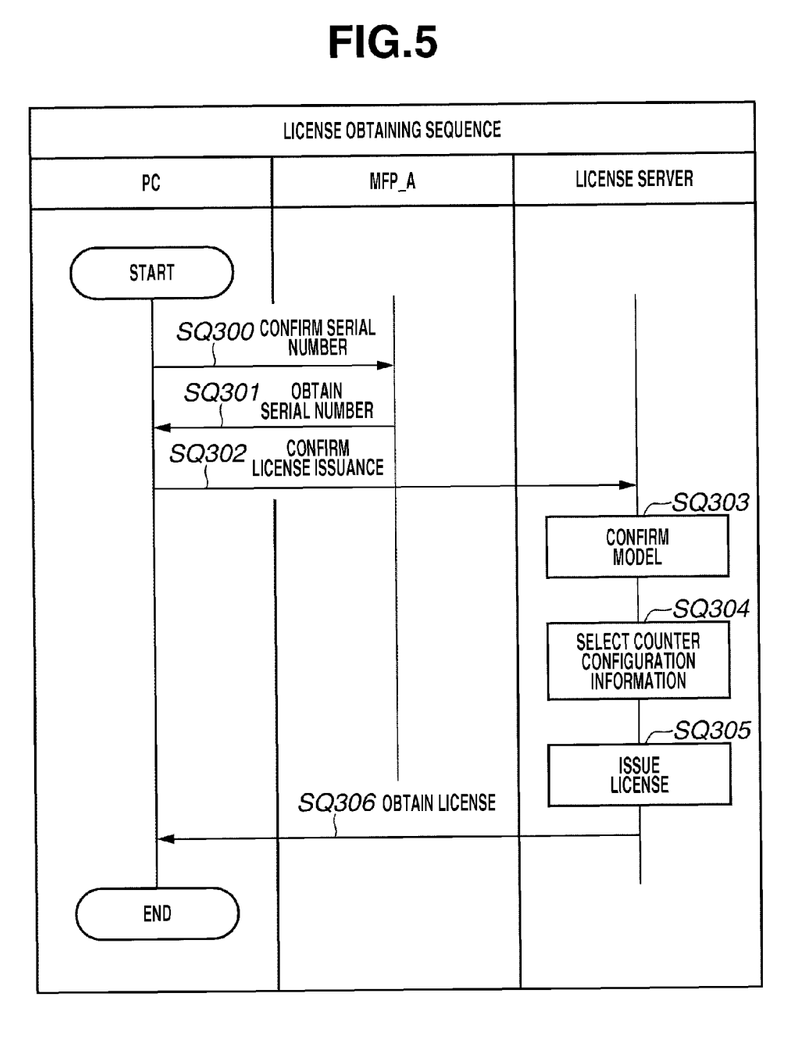
FIG. 5 is a diagram illustrating an example of a sequence of obtaining a license by a PC.

FIG. 5 is a diagram illustrating an example of a sequence for obtaining a license performed by the PC 104. In SQ 300, in reply to a user's operation, the PC 104 requests the MFP to send a serial number unique to the MFP in which an application is to be installed. (hereafter, the MFP_A is described as an example).

Next, in SQ 301, in response to the request from the PC 104, the MFP_A sends the serial number 202 to the PC 104. In SQ 302, in response to the user's operation, the PC 104 requests the license server 103 to issue a license. At this time, the PC 104 sends the obtained serial number 202 to the license server 103.

In SQ 303, the license server 103 determines the model of the MFP_A based on the serial number 202. The license server 103 identifies the MFP_A corresponding to the serial number 202 by, for example, referring to a table of information in which the serial numbers are associated with a plurality of apparatuses.

In SQ 304, the license server 103 selects counter configuration information 205 corresponding to the identified MFP_A. The license server 103 stores counter configuration information 205 where the serial numbers are associated with a plurality of apparatuses. Then, in SQ 305, the license server 103 generates a license 206 based on the counter configuration information 205.

In SQ 306, the PC 104 obtains a license 206 from the license server 103, and transmits a generated license 206 to the PC 104.

Figure 6:
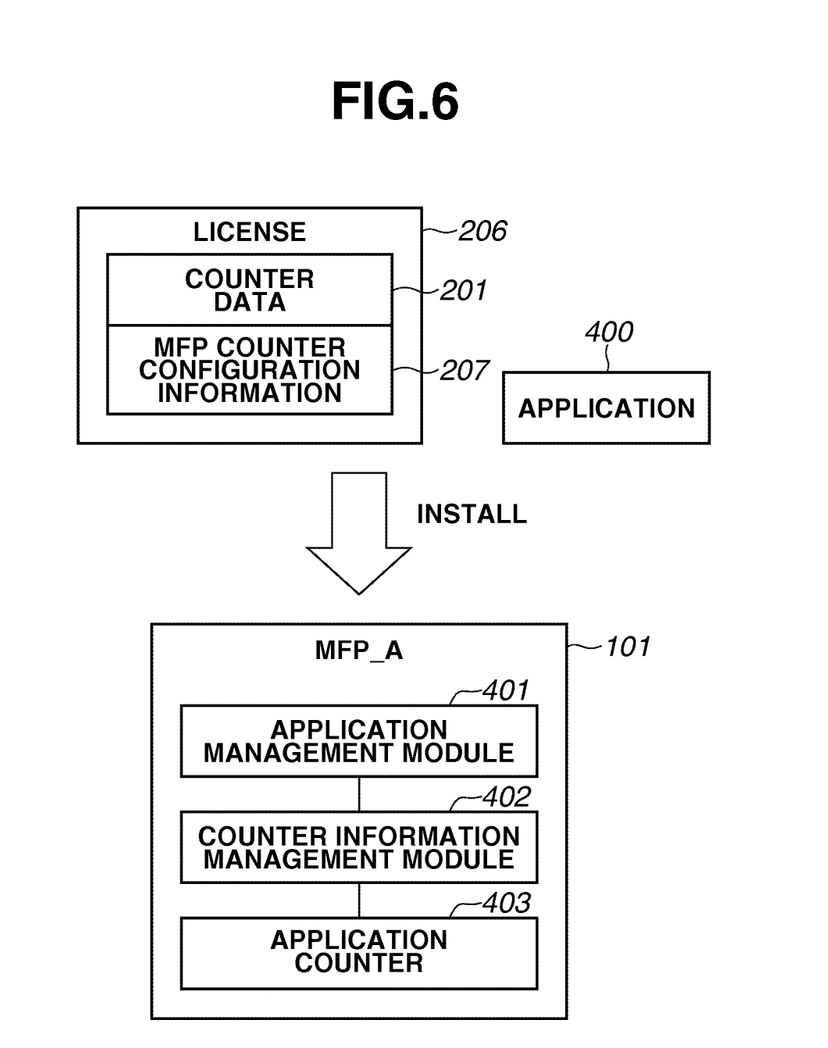
FIG. 6 is a diagram illustrating an example of a function configuration of an MFP.

FIG. 6 is a diagram illustrating an example of a functional configuration of MFP_A101. The functional configuration will be described with reference to an application program stored in a storage medium, e.g., CD-ROM, which is read by the PC 104 and transmitted through the network 100 to the MFP_A101, and an application 400 that is installed. The MFP_A101 includes an application management module 401 to manage operations to install and uninstall the application 400, and also includes a counter information management module 402 to manage counters used in the application 400.

When an application 400 is installed in the MFP_A101 in response to a request from PC 104 to perform installation, the application management module 401 installs a license 206 together with the application 400. In cooperation with the application management module 401, the counter information management module 402 generates an application counter 403 of an optimum size, which is used by the application 400 with reference to the information included in the license 206. More specifically, in generating the application counter 403, an area in the predetermined storage area is reserved where necessary counter information is to be stored. The application counter 403 will be described in greater detail with reference to FIG. 7.

Figure 7:
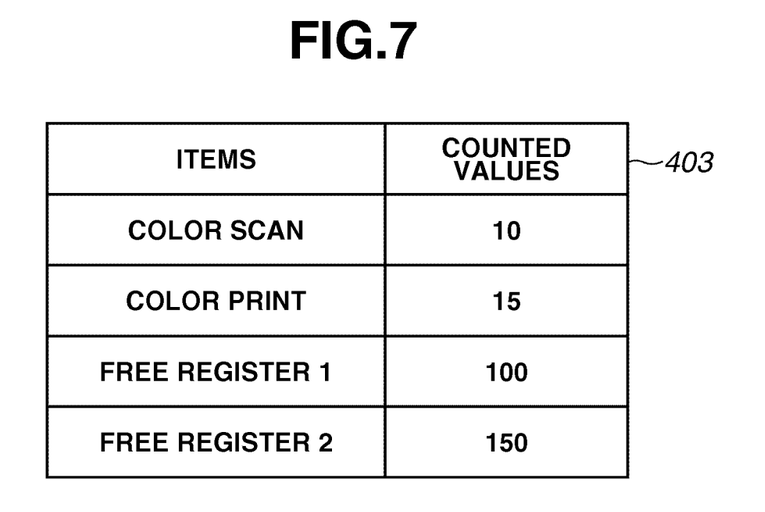
FIG. 7 is a diagram illustrating an example of an application counter.

FIG. 7 is a diagram illustrating an example of application counter 403. The application counter 403 is formed by including information, such as items for identifying counters used by the application 400 and the counted values of the counters. FIG. 7 indicates the counters "Color Scan", "Color Print", "Free Register 1", and "Free Register 2", which are used by the application 400 installed in the MFP_A101. FIG. 7 illustrates the counter values of the counter data 201 included in the license 206, which have been initialized.

Figure 8:
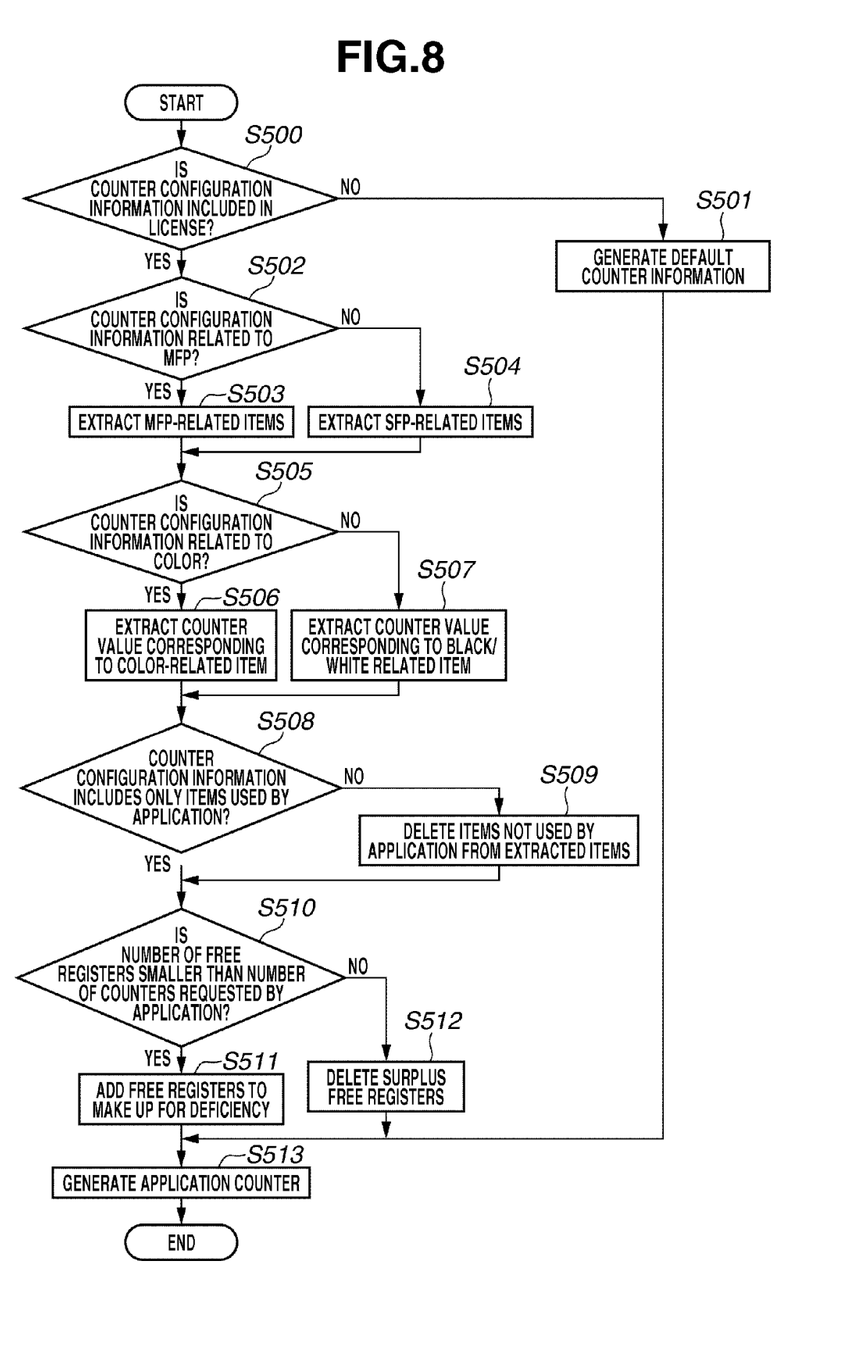
FIG. 8 is a diagram illustrating an example of a flowchart of processing of installing an application and a license.

FIG. 8 is a diagram illustrating an example of a processing flowchart for installing an application 400 and a license 20 in the MFP_A101. The install processing starts in response to the user's operation on the PC 104 to install an application and a license in the MFP_A101.

In step S500, the counter information management module 402 determines whether counter configuration information is included in the license 206. If it is determined in step S500 that counter configuration information is included (YES in step S500), the counter information management module 402 proceeds to step S502. If it is determined in step S500 that counter configuration information is not included (NO in step S500), processing in step S501 is performed. In step S501, the counter information management module 402 generates default counter information, and then performs processing in step S513.

In step S502, the counter information management module 402 determines whether the counter configuration information is MFP counter configuration information 207, based on information about items for identifying an apparatus included in the counter configuration information. In step S502, if the counter information management module 402 determines that the counter configuration information is MFP counter configuration information 207 (YES in step S502), the counter information management module 402 performs processing in step S503. If the counter configuration information is not MFP counter configuration information (NO in step S502), and then performs processing in step S504.

In step S503, the counter information management module 402 extracts MFP-related items, and then performs processing in step S505. In the present embodiment, in step S503, the counter information management module 402 extracts "Scanner" and "Printer" from the MFP counter configuration information 207 as information about MFP-related items. In step S504, the counter information management module 402 extracts an SFP-related item, and then performs processing in step S505.

In step S505, the counter information management module 402 determines whether the counter configuration information is related to color based information about an item for identifying whether apparatuses included in the counter configuration information supports color or monochrome. If it is determined that the counter configuration information is related to color (YES in step S505), the counter information management module 402 perform processing in step S506. If it is determined that the counter configuration information is not related to color (NO in step S505), the counter information management module 402 performs processing in step S507.

In step S506, the counter information management module 402 extracts counter values corresponding to color-related items from the counter data 201 included in the license 206 issued by the license server 103, and then performs processing in step S508. In the present embodiment, a counter value "10" of the item "Color Scan" and a counter value "15" of the "Color Print" are extracted. In step S507, the counter information management module 402 extracts counter values corresponding to monochrome (B/W) related items from the counter data 201 included in the license 206 issued by the license server 103, and then performs processing in step S508

In step S508, the counter information management module 402 checks contents of the counter configuration information and determines whether the counter configuration information includes only items used by the application 400 in relation to the functions of the application 400. More specifically, the counter information management module 402 performs the above determination by comparing between information about extracted MFP-related or SFP-related items and identification information of the items (counters) used by the application 400 included in application information.

Application information includes various pieces of information about the application 400. The application information is read by the PC 104 from a storage medium containing application programs of the application 400 and transmitted by the PC 104 to the MFP_A101. Alternatively, the application information is included in application programs and stored in a non-volatile storage.

In step S508, if it is determined that the counter configuration information includes only items used by the application 400 (YES in S508), the counter information management module 402 performs processing in step S510. If it is determined that the counter configuration information does not include only items used by the application 400 (NO in step S508), processing in step S509 is performed.

In step S509, the counter information management module 402 excludes (deletes) the items (counters) not used by the application 400 from extracted related items, and performs processing in step S510.

In step S510, the counter information management module 402 determines whether a number of free registers used by the application 400 is smaller than a number of counters required by the application 400. In other words, this determination is made by comparing between information about the counter data 201 included in the license 206 and information about a number of counters required by the application 400 included in the application information. The number of counters required by the application 400 is a number stored in the above-mentioned storage medium, but may be changed by the administrator via the PC 104.

If it is determined that the number of free registers included in the counter data 201 is smaller than the number of the counters required by the application (YES in step S510), the counter information management module 402 performs processing in step S511. If it is determined that the number of free registers is larger than the number of the counters required by the application (NO in step S510), the counter information management module 402 performs processing in step S512.

In step S511, the counter information management module 402 adds free registers to make up for the shortage in number, and then performs processing in step S513. In step S512, the counter information management module 402 deletes a surplus number of free registers, and then performs processing in step S513.

In step S513, the counter information management module 402 generates application counters based on results of the above-described steps of processing. After the application 400 is installed by the application management module 401, the install processing is completed.

The counter generating processing in the present exemplary embodiment is not limited to the above-described processing, but may be changed when necessary. For example, a counter generating processing may be adopted from the prescribing information included in the application information instead of the series of processes from step S502 to step S509.

Figure 9:
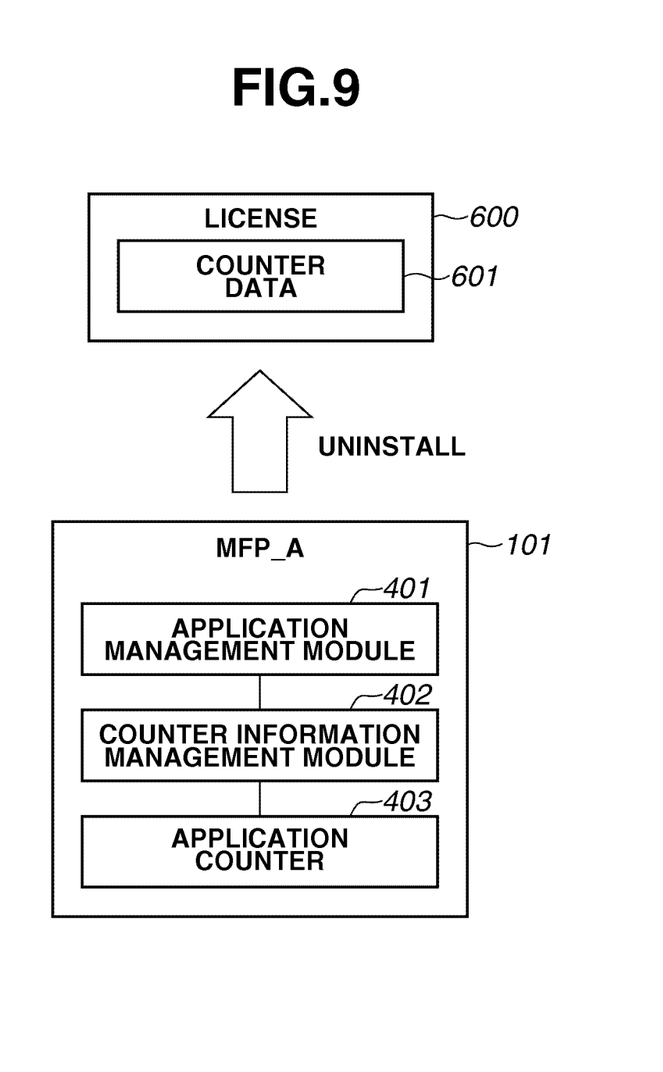
FIG. 9 is a diagram illustrating an example of a function configuration of the MFP.

FIG. 9 is a diagram illustrating an example of the MFP_A101. The MFP_A101 includes a function to uninstall the application 400 via the application management module 401. When uninstalling the application 400, the counter information management module 402 generates a license 600, which includes a counter data 601, and notifies that the application 400 has been uninstalled. The counter data 601 is similar to the counter data 201 that reflects the information in the application counter 403 related to the application 400.

Figure 10:
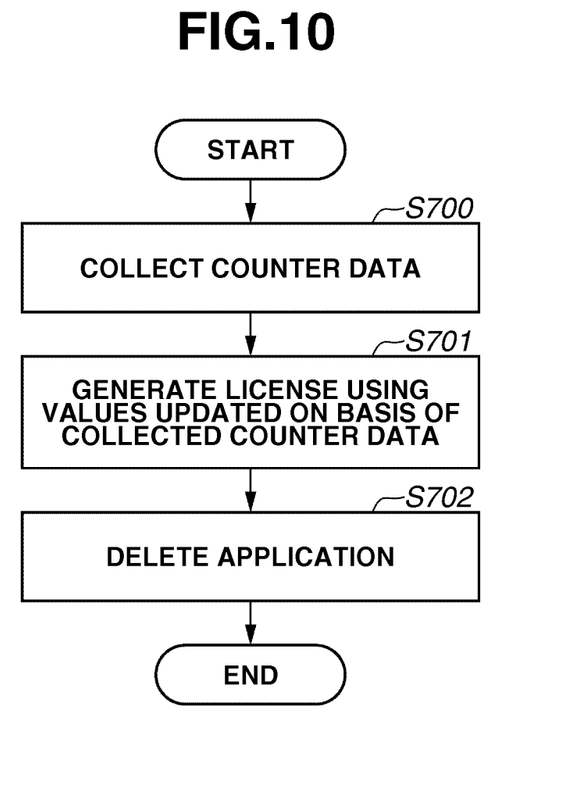
FIG. 10 is an example of a flowchart of uninstalling processing.

FIG. 10 is a diagram illustrating an example of a flowchart for uninstalling the application 400 from the MFP_A101. The uninstall processing starts in response to a user's operation on the PC 104 to uninstall the application 400 from the MFP_A101.

In step S700, the counter information management module 402 collects counter data, e.g., counter values, from the application counter 403 related to the application 400. In step S701, the counter information management module 402 updates the counter data 201 based on collected counter data, and generates a license 600. In step S702, the application management module 401 deletes the application 400 from the MFP_A101, and the uninstall processing is completed.

In the configuration described above, when an image forming apparatus generates counters corresponding to an application, an optimal storage area suitable for the type of the image forming apparatus and according to usage items of the application is created. Therefore, memory resources consumed in the image forming apparatus can be optimally used.

Note that the embodiments described above are merely examples of embodiments to implement the present invention, and the technical scope of the present invention should not be restrictively interpreted. That is, the present invention can be implemented in various forms without deviating from the technical idea or the principle features thereof.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

According to the exemplary embodiments described above, the storage area consumed by the counters can be managed in a most appropriate manner.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-258263 filed Nov. 18, 2010, which is hereby incorporated by reference herein in its entirety.

What is claimed is:

1. An image forming apparatus, comprising a processor, functioning as:
    an identification unit configured to, when at least one application and license information for the application are installed in the image forming apparatus, identify a counter used for the at least one application based on identification information indicating counters used in relation to a function of the at least one application from among a plurality of counter types specified according to a type of the image forming apparatus; and
    a counter generating unit configured to reserve an area for the counter identified by the identification unit in a storage area provided in the image forming apparatus and further reserve, in the storage area, an area for prescribed counters according to the at least one application,
    wherein the counter generating unit is configured to reserve, according to a comparison of counter data included in the installed license information and a required number of prescribed counters defined in a manifest file of each application, an area for the prescribed counters to make up for shortage in number for the required number, and
    wherein usage of the area for the prescribed counters can be set freely.

2. The image forming apparatus according to claim 1, wherein the identification unit determines whether the image forming apparatus performs image forming processing to form a color image or image forming processing to form a monochrome image.

3. The image forming apparatus according to claim 1, wherein the required number of the prescribed counters, the usage of which can be set freely, are set by an administrator for each application.

4. The image forming apparatus according to claim 1, wherein the processor further functioning as an output unit configured to read out information indicating a counted value of the counter generated by the counter generating unit from the reserved area and outputs the information to a location external from the image forming apparatus when the application is uninstalled from the image forming apparatus.

5. A method for managing a storage area of an image forming apparatus, comprising:
    identifying, when at least one application and license information for the application are installed in the image forming apparatus, a counter used for the at least one application based on identification information indicating counters used in relation to a function of the at least one application from among a plurality of counter types specified according to a type of the image forming apparatus; and reserving an area for the identified counter in the storage area, and further reserving, in the storage area, an area for prescribed counters according to the at least one application, wherein, when reserving the area, reserving an area for the prescribed counters according to comparing counter data included in the installed license information and a required number of prescribed counters defined in a manifest file of each application, to make up for shortage in number for the required number, and wherein usage of the area for the prescribed counters can be set freely.

6. A non-transitory computer readable storage medium on which is stored a computer program for causing a computer to execute a method for managing a storage area of an image forming apparatus, the method comprising:

identifying, when at least one application and license information for the application are installed in the image forming apparatus, a counter used for the at least one application based on identification information indicating counters used in relation to a function of the at least one application from among a plurality of counter types specified according to a type of the image forming apparatus; and reserving an area for the identified counter in the storage area, and further reserving, in the storage area, an area for prescribed counters according to the at least one application, wherein, when reserving the area, reserving an area for the prescribed counters according to comparing counter data included in the installed license information and a required number of prescribed counters defined in a manifest file of each application, to make up for shortage in number for the required number, and wherein usage of the area for the prescribed counters can be set freely.

* * * * *